United States Patent
Birkeland et al.

(10) Patent No.: US 7,329,829 B2
(45) Date of Patent: Feb. 12, 2008

(54) OPTICAL CABLE UNIT

(75) Inventors: Tom Harald Birkeland, Auli (NO);
Inge Vintermyr, Oslo (NO); Tom Eirik Toften, Fauske (NO); Per Arne Osborg, Askar (NO); Vegard B Larsen, Oslo (NO)

(73) Assignee: NEXANS (FR)

( * ) Notice: Subject to any disclaimer, the term of this patent is extended or adjusted under 35 U.S.C. 154(b) by 0 days.

(21) Appl. No.: 11/097,449

(22) Filed: Apr. 2, 2005

(65) Prior Publication Data
US 2005/0279737 A1    Dec. 22, 2005

(30) Foreign Application Priority Data
Apr. 2, 2004    (NO) ................. 20041392

(51) Int. Cl.
*B23K 26/04*    (2006.01)
*B21D 39/02*    (2006.01)

(52) U.S. Cl. ............... 219/121.64; 228/171; 228/173.7

(58) Field of Classification Search ............ 219/121.64
See application file for complete search history.

(56) References Cited

U.S. PATENT DOCUMENTS

| | | | |
|---|---|---|---|
| 3,183,300 A | | 5/1965 | Jachimowics et al. |
| 3,405,228 A | | 10/1968 | Polizzano .................. 174/106 |
| 4,317,003 A | | 2/1982 | Gray ............................ 174/106 |
| 4,477,147 A | | 10/1984 | Winter et al. ............. 350/96.23 |
| 4,751,777 A | * | 6/1988 | Savel, III ................. 29/898.056 |
| 5,210,391 A | * | 5/1993 | Yoshie et al. ............ 219/121.63 |
| 5,231,260 A | | 7/1993 | Yoshie et al. ............ 219/121.63 |
| 5,269,056 A | * | 12/1993 | Yang et al. ........................ 29/879 |
| 5,366,700 A | * | 11/1994 | Humpolik et al. .......... 422/180 |
| 5,502,023 A | * | 3/1996 | Humpolik et al. ........... 29/830 |
| 5,613,631 A | * | 3/1997 | Ziemek et al. ................ 228/148 |
| 5,653,898 A | * | 8/1997 | Yoshie et al. ............ 219/121.63 |
| 5,768,762 A | * | 6/1998 | Ziemek et al. ................. 29/452 |
| 5,797,183 A | * | 8/1998 | Humpolik et al. ............ 29/890 |
| 6,300,591 B1 | * | 10/2001 | Fuerschbach et al. .. 219/121.64 |
| 2001/0052511 A1 | * | 12/2001 | Briand et al. .................. 219/61 |
| 2002/0040890 A1 | * | 4/2002 | Meyer et al. ........... 219/121.64 |
| 2003/0146423 A1 | | 8/2003 | Griffioen et al. ......... 254/134.4 |

FOREIGN PATENT DOCUMENTS

| | | | | |
|---|---|---|---|---|
| EP | 61277910 | | | 8/1986 |
| FR | 2756641 | | | 6/1998 |
| JP | 56114366 | A | * | 9/1981 |
| JP | 360115381 | A | * | 6/1985 |
| JP | 02005292838 | A | * | 10/2005 |

OTHER PUBLICATIONS

European Search Report- Jun. 27, 2005.

* cited by examiner

*Primary Examiner*—Kiley Stoner
(74) *Attorney, Agent, or Firm*—Sofer & Haroun, LLP

(57) ABSTRACT

An optical cable unit has a metal tube with a longitudinal laser-welded seam and at least one optical waveguide in the interior of the metal tube. The metal tube has a first inner layer and a second outer layer, where the first inner layer is made from copper and the second outer layer is made from austenitic steel. The longitudinal seam of both layers is laser welded and the seams of the layers are in superimposed alignment, where the laser welding is performed by a $CO_2$ laser.

1 Claim, 1 Drawing Sheet

OPTICAL CABLE UNIT

RELATED APPLICATIONS

This application is related to and claims the benefit of priority from Norwegian Patent Application No. 2004 1392, filed on Apr. 2, 2004, the entirety of which is incorporated herein by reference.

BACKGROUND

Stainless steel tubes with optical waveguides are widely used, for instance in submarine cables, in the metal screen of power cables and in overhead power lines (WO 96/31885, EP 0 285 917, EP 0 286 804).

A method for manufacturing an optical cable unit, comprising a metal tube and several optical waveguides therein is disclosed in U.S. Pat. No. 5,768,762.

A metal tape of austenitic steel is gradually shaped into a lengthwise slotted tube, the optical waveguides are introduced into the still open slotted tube, the lengthwise slotted tube is welded and the outside diameter of the welded tube is reduced.

From EP 1 184 128 it is known to produce metal tubes of copper by welding the seam with a laser beam. Copper reflects the laser beam and it is therefor difficult, to input the laser energy into the copper material.

OBJECTS AND SUMMARY

To solve this problem it is proposed to roughen the region of the weld seam and apply a fluid hydrocarbon to the weld region.

Object of the invention is to improve an optical cable unit as described above with respect to the electrical conductivity and extra-protection to environmental impacts like hydrogen.

According to the invention the metal tube consists of two layers, the first inner layer being of copper and the second outer layer being of austenitic steel. The longitudinal seam of both layers is welded by a laser. The seams of the layers are in superimposed alignment. Laser welding has been made by means of a $CO_2$ laser.

According to one embodiment of the invention the metal tube is made of a laminate of austenitic steel and copper.

According to another embodiment of the invention the outer diameter of the metal tube is from 2.5 to 4.0 mm and the wall thickness of the tube is from 0.2 to 0.3 mm and the wall thickness of the copper layer is from 0.04 to 0.06 mm.

Another object of the invention is a method for producing an optical cable unit, comprising a metal tube with a longitudinally welded seam and at least one optical waveguide in the interior of the metal tube, wherein a metal tape is continuously formed to a slotted tube the at least one optical waveguide is continuously put into the still open slotted tube and the slot is closed by a laser welding unit.

In an embodiment of the method a laminated tape of a layer of austenitic steel and a layer of copper is formed to a slotted tube, the slotted tube is welded by a $CO_2$ laser, whereby the heat brought into the layer of austenitic steel causes welding the seam of the copper layer.

It is preferred, that the copper layer is on the inner side of the metal tube. In principle it should not be possible to weld a copper tube by means of a $CO_2$ laser without any special precaution but the induction heating from the steel welding process results in welding of the copper as well.

The new solution requires only one welding station and welding of both copper and steel is performed in the same process.

BRIEF DESCRIPTION OF THE DRAWINGS

The present invention will be better understood from the following detailed description, made solely by way of non-limiting example, with also referring to the figures of the attached drawings, wherein.

DETAILED DESCRIPTION

Figure 1:
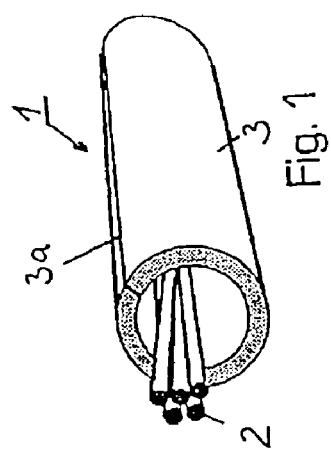
FIG. 1 is a perspective view of part of an optical cable unit (prior art).

Turning first to FIG. 1, therein is illustrated a portion of an optical cable unit 1. The optical cable unit 1 comprises optical waveguides 2 in a metal tube 3 which contains a lengthwise welded seam 3a. The open space between the optical waveguides 2 and the metal tube 3 can be filled with a filling compound to prevent water from migrating lengthwise. The number of optical waveguides 2 is usually between six and twenty, but can be up to 40. The optical waveguides 2 have a longer length (or over-length) than the metal tube 3. This over-length is normally about 0.2% to 0.3%. The wall thickness of the metal tube is 0.2-0.3 mm while its outside diameter is 2.5-4.0 mm. This is typical data for an optical cable unit, which is used instead of a wire in a transmission cable.

Figure 2:
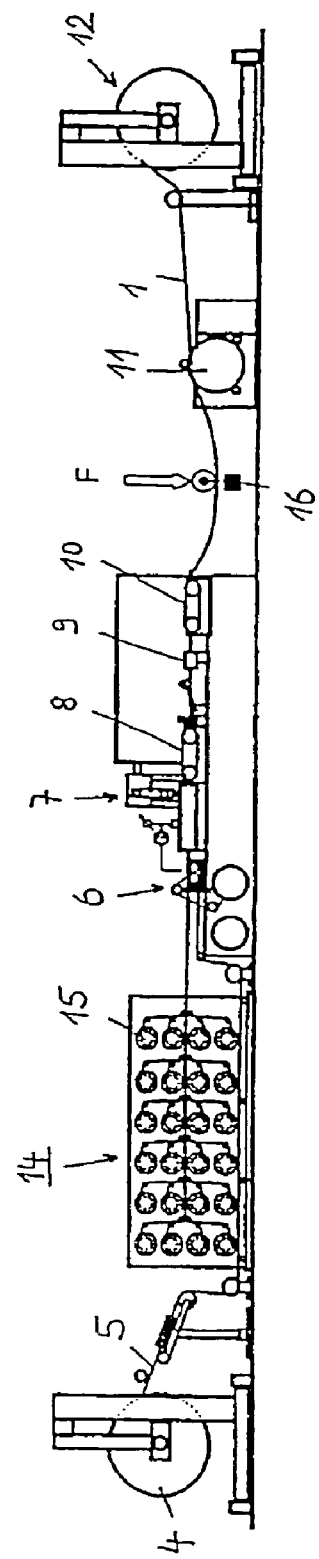
FIG. 2 is a side elevation of a device for carrying out the method of the invention.

As seen in FIG. 2, a tape 5 is continuously drawn from a supply reel 4 and fed to a forming device 6, in which the tape 5 is shaped into a lengthwise slotted tube. Part of this forming device 6 is a trimming tool (not shown in detail), which is used to cut the tape 5 to the required width. The forming tool 6 further comprises several sets of shaping rollers (not shown in detail). The lengthwise slot of the slotted tube is closed by a laser welding device 7 which forms the lengthwise seam 3a (FIG. 1). Precise guidance of the slotted tube under the welding device 7 is provided by a first clamping tool 8 containing a number of clamping jaw pairs that surround the tube and are driven by an endless chain. A tube reduction device 9, e.g. a drawing device in which the diameter of the tube is reduced is located downstream of the first clamping tool 8. A second clamping tool 10 is located downstream of the tube reduction device 9 and grips the drawn tube and pulls it through the drawing device. The drawing speed of the second clamping tool 10 with respect to the drawing speed of the first clamping tool 8 is controlled as a function of the tube's slack between the drawing device 9 and the first clamping tool 8. A driven take-up reel 11 is located downstream of second clamping tool 10, and the tube is wound several times around its periphery. The speed of take-up reel 11 equals the take-up speed of the second clamping tool 10. A storage reel 12 is located behind take-up reel 11 and reels the cable 1 under a slight tension. A supply device 14 for a number of optical waveguides 2 is located between the supply reel 4 and the forming device 6 and is equipped with a number of spools 15 onto which the optical waveguides 2 are wound. The optical waveguides 2 are drawn from the spools 15 and introduced into slotted tube before the welding device 7. A stationary metal tubelet (not shown) protrudes into the slotted tube as protection for the sensitive optical waveguides 2, which are guided through it. At the earliest, the metal tubelet releases the optical waveguides 2 behind the welding device 7. The metal tubelet is concentrically surrounded by another metal tubelet (not shown). The tube is filled with petroleum jelly under pressure through the annular gap formed by the two concentric metal tubelets. To provide the optical waveguides 2 inside metal tube 3 with over-length, the welded metal tube is continuously and elastically strained, i.e. expanded, between the second clamping tool 10, whose pairs of jaws securely grip the welded metal and apply the deformation forces to produce the tube reduction, and the take-up reel 11. This causes the take-up reel 11 to wind the same length of metal tube 3 and optical waveguides 2. The elastic strain "relaxes" on take-up reel 11 thereby shortening the metal tube 3 to its normal condition and providing the over-length.

The elastic strain is caused by a force F, which deflects the welded metal tube between the second clamping tool 10 and the take-up reel 11. This is achieved with a weight 16, which is hung onto the metal tube, e.g. by means of a roller (not shown in detail). The force F, i.e. the weight 16, determines the magnitude of the deflection and thereby the magnitude of the expansion.

The force F may be caused by a roller (not shown) which deflects the tube in the same direction as the weight 16.

With a specified geometry and by choosing the material for metal tube 3, a selection of the force F can produce an exact over-length of the optical waveguide inside tube 3.

Figure 3:
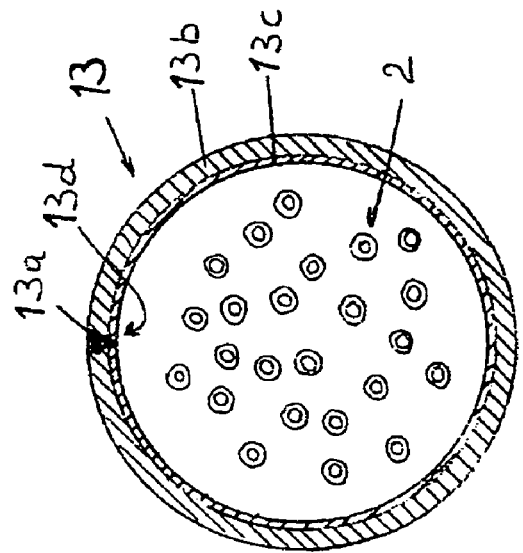
FIG. 3 is a cross-sectional view of an optical cable unit according to the invention.

According to the invention the tape 5 is a laminate of austenic steel and copper and the welding device is a $CO_2$ laser. The $CO_2$ laser welds the seam 13*a* of the austenitic layer 13*b* of the metal tube 13 (FIG. 3). The welding heat which is input to the seam 13*a* of the austenitic layer of the laminate penetrates the wall thickness of the layer 13*b* and causes the edges of the copper layer 13*c* to be welded together. The welding seam 13*d* of the copper layer 13*c* is free of voids as is the welding seam 13*a* of the layer 13*b*.

In a preferred embodiment of the invention the laminated tape has a wall thickness of 0.25 mm. The wall thickness of the copper layer 13*c* is 0.05 mm.

The invention claimed is:

1. A method for producing an optical cable unit said method comprising the steps of:
    continuously forming a laminated tape being formed from a first layer of austenitic steel and a second layer of copper into a slotted tube, where said first layer of austenitic steel forms an exterior of said tube and said second layer of copper forms an interior of said tube and said first layer and said second layer are in direct contact with each other;
    continuously placing the at least one optical waveguide into said slotted tube;
    closing said slot by welding a seam using a $CO_2$ laser welding unit; and
    wherein said welding of said seam of the slotted tube is performed by operating said $CO_2$ laser welding unit at said seam against said exterior first layer of austenitic steel such that heat of such welding causes welding of the seam in said second underlying copper layer without being directly contacted by a beam from said $CO_2$ laser welding unit, where the welded seam of said second copper layer and the welded seam of said first austenitic layer are free of voids, for improving conductivity and sensitivity to environmental impact for said optical cable.

* * * * *